Nov. 2, 1954 — W. Z. JARMICKI — 2,693,323

SPOOL OR REEL CONSTRUCTION

Filed March 15, 1952 — 3 Sheets-Sheet 1

INVENTOR.
Wincenty Zygmunt Jarmicki
BY
Attorney.

Nov. 2, 1954 — W. Z. JARMICKI — 2,693,323
SPOOL OR REEL CONSTRUCTION
Filed March 15, 1952 — 3 Sheets-Sheet 2
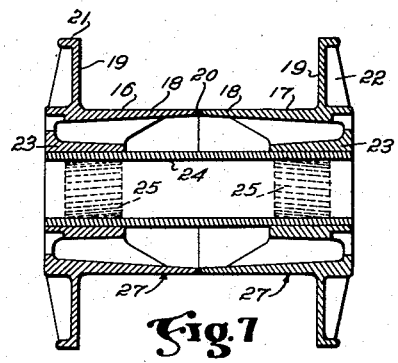
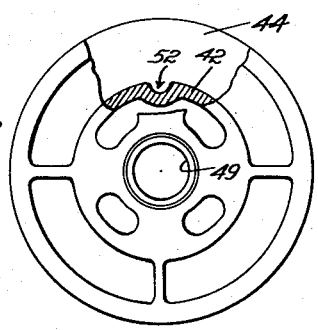
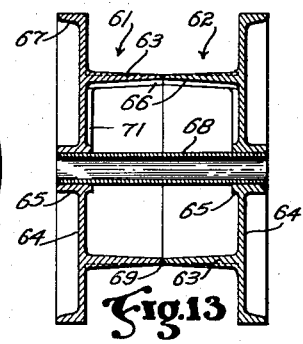
INVENTOR.
Wincenty Zygmunt Jarmicki Nov. 2, 1954   W. Z. JARMICKI   2,693,323
SPOOL OR REEL CONSTRUCTION
Filed March 15, 1952   3 Sheets-Sheet 3

INVENTOR.
Wincenty Zygmunt Jarmicki
BY
Attorney

United States Patent Office 2,693,323
Patented Nov. 2, 1954

2,693,323

SPOOL OR REEL CONSTRUCTION

Wincenty Zygmunt Jarmicki, Toronto, Ontario, Canada, assignor to Dominion Magnesium Limited, Toronto, Ontario, Canada, a corporation of Ontario Application March 15, 1952, Serial No. 276,856

6 Claims. (Cl. 242—118)

This invention relates to spools or reels for thread, wire and like materials.

An object of this invention is to provide a metal spool or reel having increased strength and closer tolerances on all working dimensions, while being subject to more simple and inexpensive manufacture.

The invention contemplates, in a broad aspect thereof, the provision of a spool having its end flange and at least a portion of its material-supporting drum formed from a unitary casting for subsequent attachment, in end to end relation, to another portion of such drum.

Figure 1:
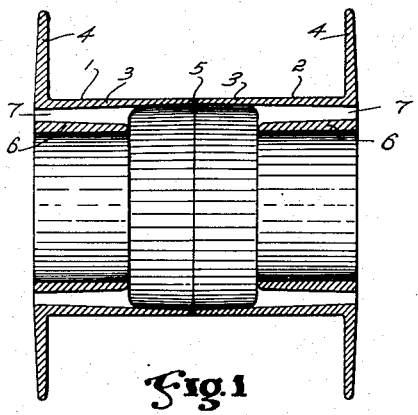
Figure 2:
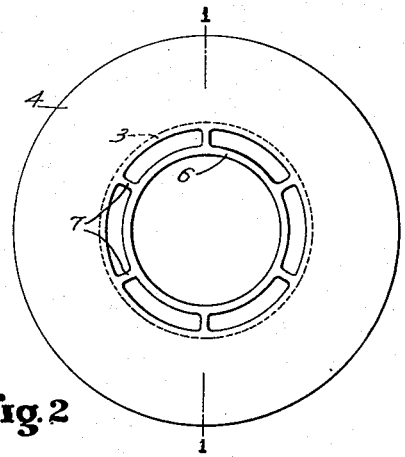
Figure 3:
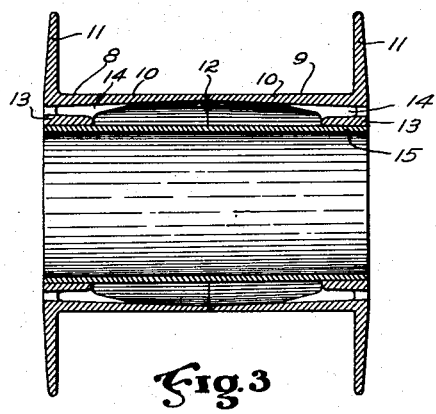
Figure 4:
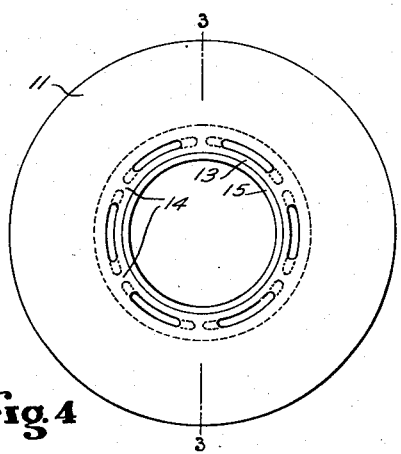
Figure 5:
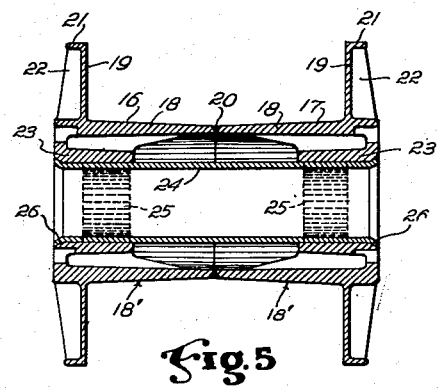
Figure 6:
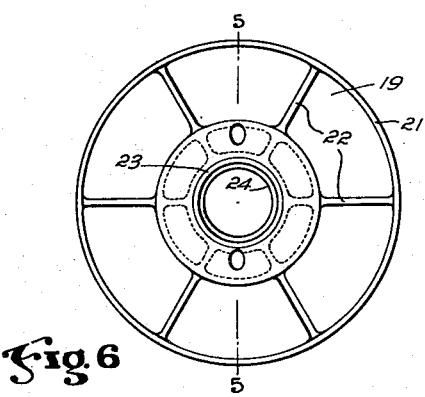
Figure 16:
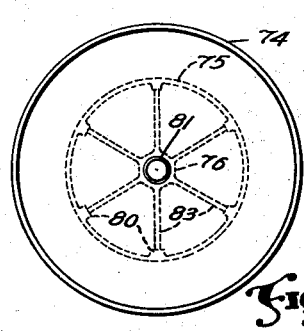
Figure 24:
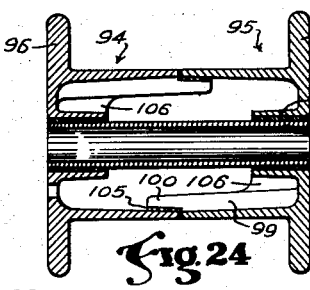
Figure 21:
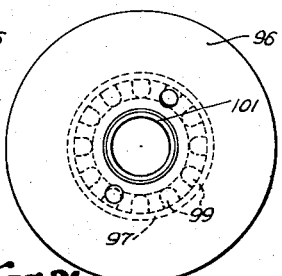
Figure 18:
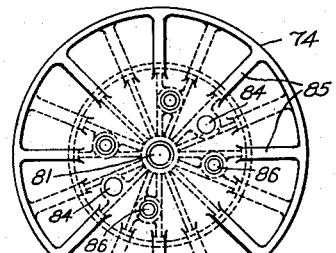
Figure 25:
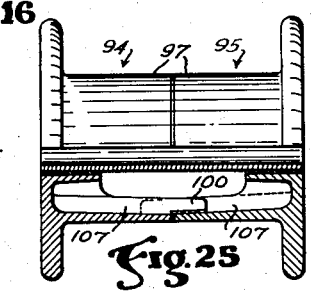
Figure 26:
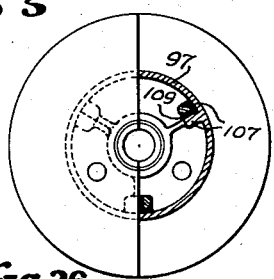
Figure 19:
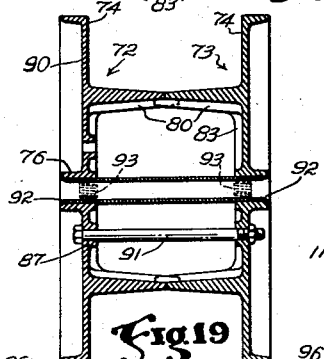
Figure 27:
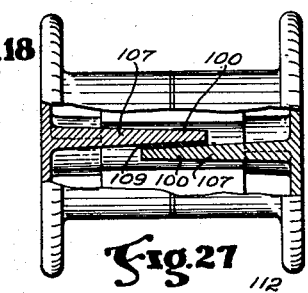
Figure 29:
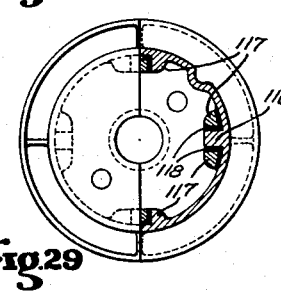
Figure 20:
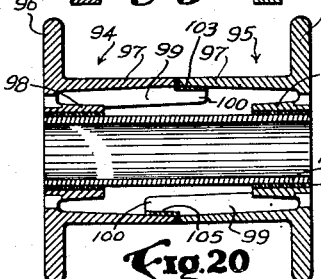
Figure 28:
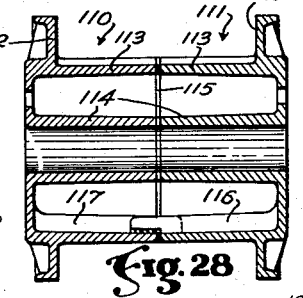
Figure 30:
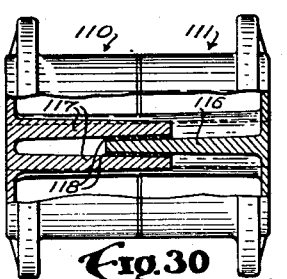
Figures 22, 23, 33, 34, 35:
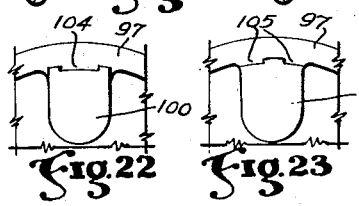

The invention will be described with reference to the accompanying drawing, in which:

Figure 1 is a longitudinal sectional view of a spool in accordance with the invention, Figure 2 is an end view of the spool shown in Figure 1, Figure 3 is a longitudinal sectional view of a modified form of spool structure, Figure 4 is an end view of the spool shown in Figure 3, Figure 5 is a longitudinal sectional view of a further modified form, Figure 6 is an end view of the spool shown in Figure 5, Figure 7 is a longitudinal sectional view of still another form of spool, Figures 8, 9 and 10 are longitudinal sectional views of other forms of spool structures, Figure 11 is an end view, partly in section, of the spool shown in Figure 10, Figures 12 and 13 are longitudinal sectional views of other modified forms of spool structures, Figure 14 is an end view of the spool shown in Figure 13, Figure 15 is a longitudinal sectional view of another form of spool, Figure 16 is an end view of the spool shown in Figure 15, Figure 17 is a longitudinal sectional view of another form of spool, Figure 18 is an end view of the spool shown in Figure 17, Figures 19 and 20 are longitudinal sectional views of other forms of spools, Figure 21 is an end view of the spool shown in Figure 20, Figures 22 and 23 are partial end views of spool parts showing alternative forms of drum lugs, Figure 24 is a longitudinal sectional view of another form of spool, Figures 25 and 26 are side and end views, respectively, partly in section, of another form of spool, Figure 27 is another side view, partly in section, of the spool shown in Figures 25 and 26, Figure 28 is a longitudinal sectional view of another form of spool, Figures 29 and 30 are end and side views, respectively, partly in section, of the spool shown in Figure 28, Figure 31 is a partial side view, partly in section, of a tube anchoring structure, Figure 32 is a cross section of the tube shown in Figure 31, and Figures 33, 34 and 35 are partial side views, partly in section, of alternative forms of tube anchoring structures.

Referring to Figures 1 and 2, the spool shown comprises a pair of substantially identical unitary halves 1 and 2, each formed of a single metal casting. Each half has a drum section 3 and an end disc or annular end flange 4. In assembling the halves, the drum sections are arranged in edge to edge relation and such edges joined together, by welding as indicated at 5, or by use of a suitable bonding medium or adhesive.

Each half is provided with an aligned axial hub or center tube 6, cast integrally with the remainder of the half and connected to the drum as by ribs 7.

Referring to Figures 3 and 4, the spool shown comprises a pair of unitarily cast half-sections 8 and 9, each having a drum portion 10 and an end flange 11, the drum portions being joined together by welding or other bonding medium as indicated at 12. Each half has also an axial hub 13 connected to the drum by ribs 14. A center tube 15 is seated in the hubs 13 and may be held therein by welding or adhesive bonding therewith.

Referring to Figures 5 and 6, the spool illustrated comprises a pair of unitarily cast half-sections 16 and 17, each having a drum portion 18 and an end flange 19, the drum portions being joined together as indicated at 20. Each flange is provided with an outturned edge 21 from which extend a plurality of radially directed reinforcing ribs 22. Each half is provided with an integral axial hub 23. A center tube 24 is seated in the hubs and may have knurled areas 25 for frictional engagement therewith. Moreover, the ends of the tube may be flared into engagement with outer bevelled or rounded corners 26 of the hubs to rigidly locate the tube therein. With such a supporting tube anchored in the hubs, the welding or bonding medium 20 may be omitted, if desired. The material-carrying surface 18' of each drum portion is slightly tapered as shown, whereby the medial portion of the drum has a smaller overall diameter than that of the end portions.

Figure 7 illustrates a spool, which is substantially similar to that shown in Figures 5 and 6, but in which the bevelled corners 26 are omitted, and the material-carrying surfaces 27 of the drum are axially aligned.

Figure 8 illustrates a spool, which is substantially similar to that shown in Figures 5 and 6, but in which the center tube 24 is inserted and retained in place between end shoulders 28 formed by recessing each hub 23, as shown, the tube in this instance being employed especially as a guide for a spindle.

Referring to Figure 9, the spool shown is quite similar to that shown in Figures 3 and 4 and comprises a pair of unitary half-sections 29 and 30, each having a drum portion 31 and an end flange 32, the drum portions being joined together by welding 33 or the like. Each half also has an axial hub 34 connected to the drum by ribs 35. A center tube 36 is seated in the hubs 34 and may be held therein by welding 37 or the like. The outer end surfaces 38 of the flanges each lie in a flat, uninterrupted plane.

Referring to Figures 10 and 11, the spool shown comprises a pair of somewhat dissimilar unitary halves 39 and 40. Half 39 has a flange 41, drum portion 42 and a hub 43. Half 40 has a flange 44, drum portion 45 with a slightly tapered material-carrying surface 46, and a hub 47. A center tube 49 has its end portions 48 anchored in the hubs 43 and 47. As shown, each such end portion is of smaller diameter than the main portion of the tube to provide a shoulder 50 against which the end of the respective hub may bear. The spool is assembled by adhesively securing together the adjacent ends of the drum portions and the end portions 49 of the tube to the hubs, as indicated at 51. The drum may be provided with a conventional longitudinally extending groove 52.

The adhesive employed at 51 and in joining together any of the spool parts of the other forms of the invention is preferably a synthetic resin of the ethoxyline class such as that known under the trade name "Araldite."

Figure 12 illustrates a spool somewhat similar in general construction to the spool shown in Figure 10, and having dissimilar half sections 53 and 54. Section 53 is a unitary casting having a drum portion 55 of true cylindrical form and a hub 56 in which the end portion 48 of the tube 49 is secured by adhesive 51. Section 39 has a small end bead 57 instead of a flange, and thus the spool may be employed as a bobbin or the like. Section 54 has drum portion 57a of slightly tapered form, a hub 58, and an end flange 59. The drum portions may be provided with a lapped edge joint 60, as shown.

Figures 13 and 14 illustrate a somewhat different shape of spool or reel having a pair of unitary half sections 61 and 62, each comprising a drum portion 63, a flange 64, and a hub 65. The outer face of flange 64 is dished, as shown and is provided with a plurality of reinforcing ribs 70 extending from hub 65 to a peripheral rim 67. A center tube 68 has its ends anchored in the hubs by welding or adhesive bond, as desired, and the drum ends are bonded together by welding or the like 69. A plurality of equally spaced (three, as shown) internal ribs 66 are provided on the drum portions, the ribs of each half being aligned. The ribs provide substantial reinforcement for the reel and are preferably coextensive in length with the drum. Preferably, aligned ribs 71 constituting continuations of the ribs 66, extend along the interior surface of flange 64 inside the drum to hub 65. It will be observed that, in this instance, the diameter of the drum is several times greater than that of the center tube.

Referring to Figures 15 and 16, the general design is somewhat similar to that shown in Figs. 13 and 14 and comprises a pair of unitary half sections 72 and 73, each having a flange 74, a drum portion 75, and a hub 76. Flange 74 has a flat plane outer surface portion 77 adjacent the hub, a dished portion 78, and a peripheral rim 79. Each drum portion has at least three equi-spaced internal ribs 80 projecting slightly beyond the free edge of the drum portion whereby they underlap and engage the adjacent free edge of the other drum portion. In assembly, the half sections 72 and 73 are arranged whereby each rib of one section is located midway between the adjacent pair of ribs of the other section. It will be observed that the projecting portions of the ribs 80 constitute supporting and reinforcing lugs which considerably strengthen the union of the two half sections. A center tube 81 has its ends seated in the hubs 76. A suitable bonding medium 82, such as welding or plastic adhesive, is applied to the meeting edges of the drum portions and to the ends of the tube and hubs, as shown. Each flange 74 may be provided with a plurality of radially extending internal ribs 83, each extending from the hub 76 to a respective rib 80.

Figures 17 and 18 illustrate a reel which is similar in most respects with that shown in Figs. 15 and 16, but which includes a pair of driving holes 84 in one flange 74, a plurality of external reinforcing ribs 85 on each flange extending radially from the rim 79, and a plurality of connecting rods or tubes 86 each having its ends anchored in hubs 87 in the respective flanges 74 and located in off center relation to the flanges, as shown. A layer of synthetic plastic adhesive 88 is shown as the anchoring medium for the tubes 86. A layer of similar adhesive 89 is also shown as the anchoring medium for the center tube 81 in the hubs 76. However, tube 81 may be omitted in the structure described.

Figure 19 shows a reel which is closely similar to that shown in Figures 17 and 18 but in which the outer face 90 of each flange is fully dished as shown and in which bolts 91 are substituted for the tubes 86. Moreover, the center tube 81 (which may be omitted, if desired) has its ends 92 outwardly flared into engagement with rounded corners on the hubs and it may be provided with knurled areas 93 for frictional engagement with the internal surfaces of the hubs.

The chief function of the ribs 80 in the reels shown in Figures 17, 18 and 19 is to provide convenient means for locating the reel halves accurately with respect to each other during the assembling operation.

Figures 20 and 21 show a reel comprising two unitary half sections 94 and 95 each having a plane end flange 96, a drum portion 97, and a hub 98. Each drum portion is provided with a plurality of longitudinally extending internal ribs 99 having projecting ends constituting lugs 100 for underlapping engagement with the edge of the other drum portion. A center tube 101 has its ends anchored in the hubs 98 by means of a plastic bonding medium 102. The lugs 100 of each drum portion are adhesively secured to the edge of the other drum portion by means of a layer or layers of plastic bonding medium 103 and preferably for this purpose, the surface of each lug 10 is undercut, as indicated at 104 in Fig. 22 or 105 in Fig. 23, to provide a space to receive the adhesive layer. Thus, each lug 100 has a portion of its surface in full contact with the other drum portion as well as other portion or portions in bonded connection therewith. Such a structure results in more accurate and rigid assembly of the two reel sections.

The ribs 99, as shown, have sufficient height that they constitute a reinforcing connection between hub 98 and drum portion 96.

Figure 24 shows a reel which is quite similar to that shown in Figure 20, but in which the drum portion 96 is spaced radially outwardly a greater distance from hub 98 and a connecting rib 106 extends from each rib 99 to the hub.

Referring to Figures 25, 26 and 27, the reel shown is similar in structure to that shown in Figure 24 but, instead of ribs 99, ribs 107 of slightly different form are employed, each such rib (including its lug 100) having a flat side surface 108 for abutment with the complementary surface on an adjacent lug 109 carried by the opposite half section. Such surfaces are bonded together by a layer 109 of plastic adhesive.

Referring to Figures 28, 29 and 30, the reel shown comprises a pair of unitary half sections 110 and 111, each having an end flange 112, a drum portion 113, and a center tube portion 114 coextensive in length with the drum portion. The two sections are joined together by means of an adhesive bonding medium 115 between the abutting ends of the drum and tube portions. One drum portion has a plurality of longitudinally extending flat-sided internal ribs 116, and the other drum portion has a plurality of pairs of longitudinally extending internal ribs 117. The end of each rib 116 extends beyond the edge of the drum portion on which it is mounted for underlapping engagement with the adjacent edge of the other drum portion and between the ends of a pair of ribs 117. The spacing between each rib 117 of a pair is such that their sides substantially abut the projecting end of rib 116. The projecting ends of ribs 116 and 117 are bonded to each other and to the end of the opposite drum portion by means of the adhesive medium 118.

Figures 31 to 35, inclusive, illustrate a satisfactory means for adhesively anchoring the center tube in the hub of a half section of a spool or reel. In these figures, the center tube is indicated at 119 and the hub at 120. In Figures 31 and 32, a plurality of longitudinally extending undercuts 121 are provided in the outer surface of the tube to provide a space for reception of the plastic bonding medium 122 when the tube end is seated in the hub. In Figure 33, a single annular undercut 123 of substantial length is provided to receive the bonding medium 124, a short full diameter section 125 being left at the extreme end of the tube. In Figure 34, a plurality of annular undercuts 126 are provided to receive the bonding medium 127. In Figure 35, a helical undercut 128 is provided in the tube surface to receive the bonding medium 129.

The spools described are subject to inexpensive manufacture. If the spool is to be used for shipping purposes, a clean-up operation only is required on the welded surface in the welded structure type of spools. However, the surfaces of the spool may be machined as desired. The tolerances on machining of the spools described can be held to a minimum.

It will be observed that each spool section is provided with at least one integral hub. Such a hub is substantially essential in order to provide means for supporting the two sections of the spool during the welding or like operation and ensure the required smooth joint where the two sections meet. In this connection the supporting ribs between the hub and drum are also important in providing adequate support. Moreover, the fit obtained by this integral hub portion permits the use of various joining means, including the welding operation described and locking of the center tube to the hub by the various means set forth.

It will be apparent that various changes may be made in the structure shown and described, and that one or more features illustrated in each modification may be readily incorporated in other forms of the invention. The spools shown normally comprise three parts but it will be apparent that a fourth part consisting of a drum section may be added to increase the length of the drum.

The modifications illustrated in Figures 1 to 12 inclusive are especially suitable for the construction of the smaller type of spool, i. e., those of eight inch diameter or less. The modifications illustrated in the Figures 13 to 30 inclusive are especially suitable for the construction of the larger type of reel, i. e., those from eight to forty-eight inches in diameter.

When using a synthetic plastic adhesive as the connecting medium between the half sections of the spool or reel, it is preferable that the supporting lugs as carried by the internal ribs of the drum portions be employed. These supporting lugs, especially when adhesively bonded to the opposite drum section, very greatly increase the strength of the finished spool.

I claim:

1. A spool or reel comprising a pair of unitary metal castings each having a drum portion, each of said drum portions having a plurality of circumferentially spaced longitudinally extending internal ribs thereon and internal surfaces extending between each pair of adjacent ribs, each said internal surface being of continuous arcuate form from one rib to another, each said rib projecting beyond the end of one said drum portion for abutment with one of said internal surfaces of the other drum portion, and means connecting said drum portions together.

2. A spool or reel comprising a pair of unitary metal castings each having a drum portion, an annular flange at one end of the drum portion, and a hub, a separate tube having its ends seated in said hubs, means connecting together the other ends of said drum portions, each of said drum portions having a plurality of circumferentially spaced longitudinally extending internal ribs thereon and internal surfaces extending between each pair of adjacent ribs, each said internal surface being of continuous arcuate form from one rib to another, each said rib projecting beyond the end of one said drum portions for abutment with one of said internal surfaces of the other drum portion, the ribs of one drum portion being in circumferentialy spaced relation to the ribs of the other drum portion, and means adhesively bonding said rib ends to said internal drum surfaces.

3. A spool or reel as defined in claim 2, the ribs of one drum portion being in circumferentially spaced relation to the ribs of the other drum portion.

4. A spool or reel as defined in claim 2, each rib end of one drum portion being in lateral abutment with a rib end of the other drum portion, and means adhesively bonding said abutted rib ends together.

5. A spool or reel as defined in claim 2, each rib end of one drum portion being in lateral abutment with a pair of rib ends of the other drum portion, and means adhesively bonding together said abutted rib ends.

6. A spool or reel comprising a pair of unitary metal castings each having a drum portion, an annular flange at one end of the drum portion, and a hub, means connecting together the other ends of said hub portions, each of said drum portions having a plurality of longitudinally extending internal ribs thereon, said ribs having ends projecting beyond the end of each drum portion for abutment with the internal surface of the other drum portion, and means adhesively bonding said rib ends to said internal drum surface, each said rib end having an undercut area thereon receiving said adhesive bonding means.

References Cited in the file of this patent

UNITED STATES PATENTS

| Number | Name | Date |
|---|---|---|
| 987,572 | Griffin | Mar. 21, 1911 |
| 1,462,166 | Chapman | July 17, 1923 |
| 1,520,379 | Wermine | Dec. 23, 1924 |
| 1,683,273 | Wanders | Sept. 4, 1928 |
| 1,842,143 | Bowen | Jan. 19, 1932 |
| 2,190,013 | Byers | Feb. 13, 1940 |
| 2,208,456 | Howsam | July 16, 1940 |
| 2,282,156 | Benes | May 5, 1942 |
| 2,426,464 | Menking | Aug. 26, 1947 |
| 2,472,248 | Cox | June 7, 1949 |

FOREIGN PATENTS

| Number | Country | Date |
|---|---|---|
| 145,918 | Great Britain | July 8, 1920 |
| 502,816 | Great Britain | Mar. 24, 1939 |

OTHER REFERENCES

Joining Aluminum Alloys, pp. 116, 156, 158, 160, 162, 164, Steel, Sept. 11, 1944.

Adhesive and Theory of Adhesion, pp. 100–103, 106, 108, 110, Steel, Apr. 15, 1946.